June 19, 1956 G. BONMARTINI 2,751,259
ROLLING DEVICE FOR VEHICLES OF EVERY KIND
Filed Jan. 19, 1954 9 Sheets-Sheet 1

June 19, 1956  G. BONMARTINI  2,751,259
ROLLING DEVICE FOR VEHICLES OF EVERY KIND
Filed Jan. 19, 1954  9 Sheets-Sheet 2

June 19, 1956         G. BONMARTINI        2,751,259
ROLLING DEVICE FOR VEHICLES OF EVERY KIND
Filed Jan. 19, 1954                            9 Sheets-Sheet 4

June 19, 1956 G. BONMARTINI 2,751,259
ROLLING DEVICE FOR VEHICLES OF EVERY KIND
Filed Jan. 19, 1954 9 Sheets-Sheet 5

June 19, 1956　　　G. BONMARTINI　　　2,751,259
ROLLING DEVICE FOR VEHICLES OF EVERY KIND
Filed Jan. 19, 1954　　　　　　　　　　　　　9 Sheets-Sheet 8

United States Patent Office 2,751,259
Patented June 19, 1956

2,751,259
ROLLING DEVICE FOR VEHICLES OF EVERY KIND

Giovanni Bonmartini, Rome, Italy, assignor to "Est" Etablissement Sciences Techniques, Vaduz, Liechtenstein, a company of Liechtenstein Application January 19, 1954, Serial No. 405,011

Claims priority, application Italy January 22, 1953

12 Claims. (Cl. 305—9)

The present invention relates to a rolling device of the track type, wherein at the periphery of a track are secured transversely rotatable members, the axes of rotation of which are disposed along the length of the track, and the track is in turn mounted on wheels connected with the vehicle, around which wheels the track is adapted to move in a circuitous path. It is known that during the movement of a vehicle provided with one pair of tracks, change of the direction of the vehicle is obtained by varying the speed of a track of the pair with respect to the other, for example, by braking the track on the side toward which it is desired to turn. With conventional tracks formed with a plurality of substantially flat segments, change of the direction results in a violent lateral scraping of the segments of the track on the ground particularly at the forward and rearward portions of the track. On the contrary, by providing the segments of the track with members rotatable about an axis parallel to the longitudinal axis of the track, said scraping during the change of direction is avoided since the sliding friction is replaced by the rolling friction of the rotatable members on the ground.

If the ground whereon the vehicle moves slopes in a direction at right angles to the motion direction, the vehicle will glide on its side, deviating from the predetermined path. Then, if the driver is willing to vary the motion direction, by altering the speeds of circuitous motion of the tracks, the vehicle will move on a curve, but the center of said curve will be indetermined and therefore the vehicle will move in a path which in general will be different from that desired.

According to the present invention, in order to avoid said inconveniences the rolling effect of some of said transversely rotatable members of the track is neutralized, and precisely those members which, at any moment are in a predetermined resting zone on the ground.

The transverse displacements in the straight motion are thus prevented, due to the friction produced in a transverse direction by the neutralised rotatable members.

The vehicle is very efficacious if the driver is willing to move in a curved path by changing the speeds of the tracks, as the transverse resistance of the neutralised rotatable members determines the center of the curve which must fall on the straight line, parallel to the ground and at right angles to the tracks, passing through the zone of the neutralised rotatable members.

According to the present invention, in order to embody the desired neutralisation of the rotatable members (which will be termed hereinafter "rollers" for concision) use is made of devices adapted to brake the rotation of the aforesaid rollers when passing through the pre-determined resting zone. Also it is possible to use devices as substitutes for the rollers, such as members resting on the ground, which are not adapted to revolve.

Moreover, according to the present invention said neutralising devices are so constructed and arranged that, under the control of the driver of the vehicle, they are adapted to extend their braking action on the rollers of further zones of the tracks and, even, on all of the rollers resting on the ground, thereby further increasing the resistance of the vehicle to the transverse motions, even with scraping on the ground, as it is necessary when the vehicle is moving on a steep slope in a direction at right angles to the direction of movement. In one embodiment of the present invention, the braking devices are formed by wheels connected with the vehicle, the rotation axes of said wheels being parallel to the axis of the circuitous path of the tracks; when the rollers pass in conjunction with said wheels, the rollers rest on the wheels and their rotation is thus prevented by friction.

According to the present invention, some of said wheels can be, at will, lifted or lowered thus reducing or extending the braking zone of the rollers.

According to another embodiment of the present invention (which can be used when the rollers are arranged in pairs) the rollers of each pair are caused to come into contact with each other when passing through the pre-determined zone, thereby being prevented, by friction, from rotation.

According to a further embodiment of the invention, each roller is provided with a braking device, known per se, which is operated by a member carried by the frame of the track, when the roller passes through a determined position of its circuitous path.

According to a still further form of embodiment the braking action is obtained by an auxiliary track (hereinafter called "ring") flexible or articulated, mounted on pulleys and arranged so as to run parallel to a portion resting on the ground of the track, incapable of transverse displacements, pressing on the surfaces of the rollers and causing them to be braked against rotation, although the circuitous motion of the track is not restrained. The advantage of this arrangement resides in that the braking of said rollers is continuous in the whole zone of contact between the rollers and the braking ring instead of being at intervals as in case of the aforementioned simple braking wheels.

The braking ring can be placed in any plane; particularly if it is arranged in a vertical plane parallel to that of the circuitous motion of the tracks, the braking ring can take up one portion of the weight supported by the track.

The present invention will now be disclosed by means of certain examples, for the purpose of clarifying but in no way limiting the scope of the present invention, which scope is to be understood as covering any device, apparatus or machine incorporating the teaching obtained from this disclosure; it is therefore declared that the invention is in no way limited to the forms illustrated or disclosed by way of example, but it is extended to the idea of a track, wherein the single links are provided with one or more rollers the axes of rotation of which are disposed along the length of the track, mounted on a frame by means of wheels, so as to be adapted to move in a circuitous path around said frame, said track being combined with a braking device carried by said frame and adapted to prevent the rotation around their axes, but not their circuitous movement, of said rollers whenever a determined zone of the circuitous path of the track is reached.

It is also to be noted that the object of the present invention applies to vehicles of every kind and that the term "vehicles" applies to every means, be it either quick or slow, which move on the ground: the normally moving ground vehicles (tractors, motor-lorries, motor-cars, hauled cars, bogies and the like, tanks), this term is understood to comprise also aircraft (aeroplanes, seaplanes, helicopters and the like) and floating vehicles (motor-boats, submarines, hulks, boats in general). Obviously, in case of vehicles wherein this is desired by weight conditions (aircraft) or for other reasons, the aforesaid transversely rotatable members, generically termed "rollers" in the present description, can be made of different materials as, for instance, light metals, massive rubber, metallic rollers with rubber tires, rollers provided with pneumatic or semi-pneumatic tires, comprising a tire made of sponge rubber, rollers made of synthetic materials, rollers totally made of pneumatic bodies. The term "rubber" is to be understood to mean both the natural elastic rubber, and any technologically equivalent, or substantially equivalent product.

Although known per se, and therefore issuing from the scope of the present invention, it is to be understood that the track vehicles, to which the device according to the present invention can be applied, are caused to move on the ground either by traction by a hauling vehicle or member, or by the operation of the tracks in their circuitous motion, said tracks being caused to move by engines carried by said vehicles. Each vehicle can be provided with one, two or more tracks, the equilibrium being obtained, in case of a vehicle provided with a single track, by means of a gyroscopic stabilizing system or the like. The steering or turning movement of the vehicle in the plane of the ground is obtained, in a way known per se, by making different the circuitous speeds of the tracks, in case of vehicles provided with two or more tracks. On the contrary, in case of a vehicle provided with a single track and gyroscopically stabilized, the steering movement is obtained, in a way known per se, by the angular displacement with respect to a gyroscope the axis whereof is horizontal, carried by said vehicle, or by a different stress, as for instance by the traction of aerial propellers arranged so as to create a rotating movement of the vehicle in respect to the medium resting point on the ground.

The present invention is hereinafter described, and illustrated in the attached drawings, wherein.

Figure 1:
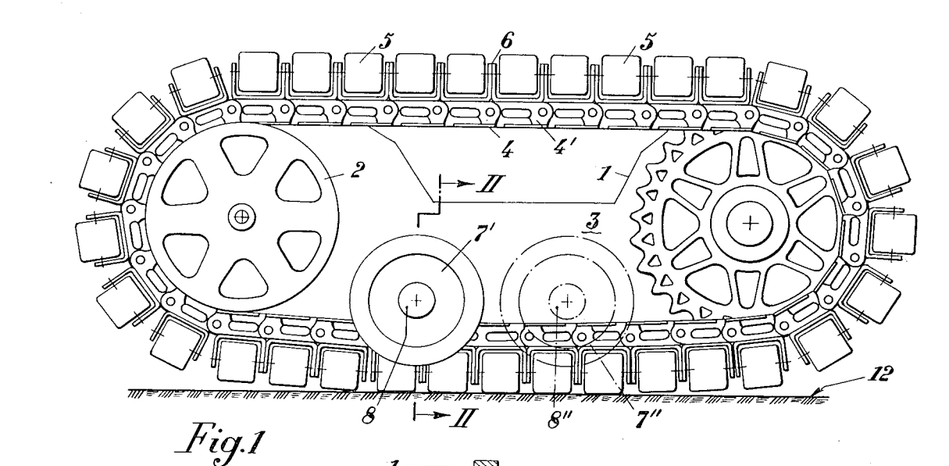
Fig. 1 shows in lateral elevation a track for tractors, mounted on two wheels of a frame connected with the vehicle (not shown), wherein each element of the track comprises a chain linkage carrying a pair of rollers the axes whereof are arranged in the same direction of the circuitous motion of the track, with a device for blocking said rollers, when passing through pre-determined positions in respect of said frame, in order to prevent their rotational movement around their axes, but allowing movement according to the circuitous motion of a track.
Figure 2:
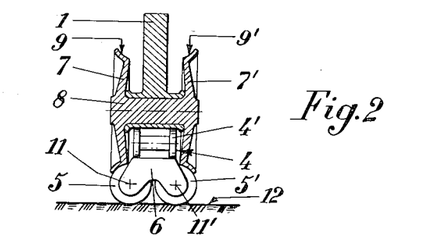
Fig. 2 is a cross-section taken along the line II—II of Fig. 1.

With reference to Figs. 1 and 2 of the drawings, on a frame 1, connected with a vehicle not shown, are mounted the wheels 2 and 3, of which the latter (merely by way of non-limitative example) is the operative toothed wheel, and co-operates with the chain track 4, which passes circuitously round both the wheels 2 and 3. Each link 4' of the track 4 carries two rollers 5, 5' by means of a stirrup 6, wherein said rollers are pivoted with their axes parallel to the track direction. A pair of discs 7, 7' fixedly spaced apart from one another on a shaft 8 carried by the frame 1 rest, at their periphery 9, 9' on the periphery of the rollers 5, 5' which in their turn are carried by the stirrup 6 connected with the links 4' of the track 4. In conjunction with the discs 7, 7', the rollers 5, 5' which one after the other move into contact with said discs 7, 7', due to the circuitous motion of the track 4, are prevented from rotating round their shafts 11, 11' and they therefore oppose, by friction with the ground 12, the transverse movement of the track 4 and therefore of the frame 1 and of the vehicle connected thereto.

The rollers 5, 5', which one after the other engage with the peripheries 9, 9' of the discs 7, 7', when passing in conjunction with the shaft 8, the position of which is fixed with respect to the frame 1, form with the ground an engagement similar to that of a common wheel coplanar with the track and resting on the ground instead of the said rollers, thus preventing, for that portion of the frame which is in contact with the discs 7, 7', any transverse movement on the ground. Also vice versa, the remaining rollers 5, which rest on the ground, but are free to rotate around their shafts, do not oppose any resistance to the lateral displacement of the corresponding portion of the frame 1, which can thus carry out angular movements on the ground. Thus the resistance to any angular movement of the vehicle, with the track 4 stopped in its circuitous motion, or moving, is reduced to the resistance of the rotary couplings concerned.

In the example of Figs. 1 and 2, the braking of the rollers 5 against rotation about their shafts, when passing the vertical line connecting the shaft 8 with the ground, can be effected also in a second position, near the preceding one, as shown at dotted line in 7'' and 8''. The horizontal distance between the shafts 8 and 8' of the braking members is limited to such an extent that a rotation of the entire vehicle together with the frame 1, involves a far lesser resistance than if the track 4 consisted of common tractor plates, i. e. without the rollers 5.

It is obvious that the rollers 5 can have whatever form suitable to the practical requirements (i. e. a cylindrical form, a spherical form, a discoidal form and so on), and that the details of the embodiment shown in Figs. 1 and 2 can be modified according to the practical exigencies and the rules of the known art, without departing from the scope of the present invention.

For instance, instead of two rollers 5 for each link of the track, a single roller per link can be used, all the rollers being arranged in the same position in respect to the relative link, or they can be arranged alternately on one side and on the other of the vertical intermediate plane passing through each link so as to render minimum the possibility of the track being blocked during its operation due to the insertion of stones or other material between roller and roller in the zone wherein, in the movement of the track, each roller descends toward the ground passing on the wheel 2 or on the wheel 3, according to the movement of the vehicle to either side, as shown in Fig. 1.

According to the present invention, the braking discs 7, 7' respectively, can be lifted or lowered at will in respect to the track 4, in a known way, so as to engage or disengage the rollers 5 and 5' of said track.

Figure 3:
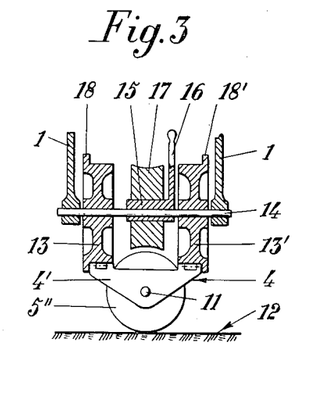
Fig. 3 is a cross-section similar to that of Fig. 2, showing the detail of a track wherein each link carries a single tread-roller, the braking device of the roller comprising a roll mounted on a controllable eccentric support.

A variation of the invention is shown in Fig. 3, which is a cross-section similar to that of Fig. 2, wherein for each link 4' is mounted a single roller 5", and the load of the vehicle carried by said frame 1 is transmitted to the link through the wheels 13, 13', mounted on the frame 1 by the shaft 14. Centrally on the shaft 14 is mounted an eccentric 15 which can be controlled by a suitable member 16 and which carries a braking roll 17, having a suitable profile, which, by the rotation of the eccentric 15, by means of the control 16 can be caused to press on the periphery of the roller 5", transmitting thereto the weight of the frame 1, and contemporaneously slightly lifting the wheels 13, 13', from the rest on the link 4'. The flanged edges 18, 18' of the wheels 13, 13' are so constructed, and radially extend to such an extent that when the wheels 13, 13' are lifted, the side edges of the link 4' always remain transversely engaged by said edges 18. The transverse stresses applied by the ground 12 to the roller 5", which is prevented from rotating around its shaft 11 by the friction exerted thereon by the roll 17, are thus transmitted to the frame 1 by the contrast between the link 4' and one or the other of the flanged edges 18, 18' of the wheels 13, 13'. It will be noted that this brake device allows the circuitous motion of the track independently from the braking or non-braking position assumed every time by the device.

Figure 4:
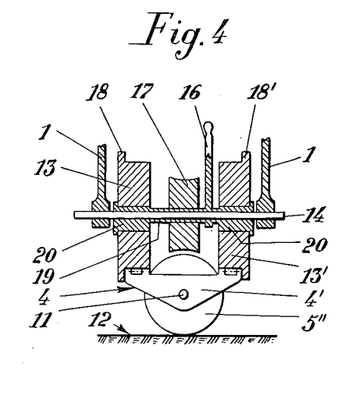
Figs. 4 and 5 are cross-sections similar to Fig. 3 and showing slight variations of the same device.

Fig. 4 shows a variation of the device shown in Fig. 3. The corresponding parts have been shown by the same reference numerals. In the case of this embodiment, the central roll 17 is mounted on a sleeve 19 concentrical with the shaft 14 and provided with eccentric extensions 20 which carry in their turn the wheels 13, 13'. The operation is similar to that of the device of Fig. 3.

Figure 5:
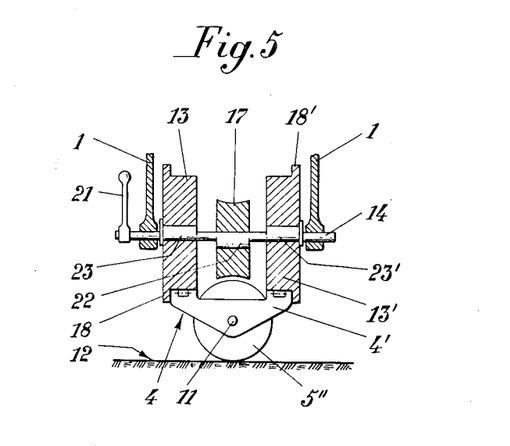

Fig. 5 shows a further variation of the device of Figs. 3 and 4, differing therefrom due to the fact that the shaft 14 is rotatable in respect to the frame 1 by means of the lever 21 and carries the roll 17 and the wheels 13, 13' respectively by means of eccentrics 22 and 23, 23' which are differently oriented round the axis of the shaft 14, so that when the angular position of this latter varies, either the wheels 13, 13' or the roll 17 come in contact on the link 4' so as to render the roller 5" free to rotate or to brake it respectively.

Figure 6:
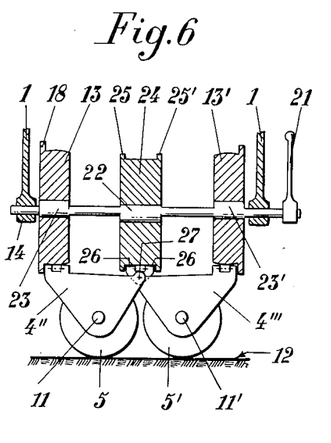
Figs. 6 and 7 show two different operative positions of a device similar to that of Fig. 5, suitable to the use of two tread-rollers for each link of the track.
Figure 7:
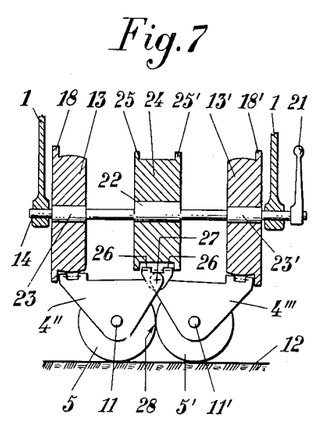

The Figs. 6 and 7 show a brake device for pairs of rollers 5, 5' carried by an articulated link 4", 4''', in two different positions, i. e.: Fig. 6 shows the position for the free rotation of the rollers 5, 5', while Fig. 7 shows the brake position of same. The frame 1 carries a shaft 14 provided with eccentrics 22 and 23, 23' (likewise to that already described with reference to Fig. 5) whereon are respectively mounted the roll 24 and the wheels 13, 13'. The roll 24 (differently from the roll 17 of Fig. 5) is provided with edges 25, 25', destined to co-operate with the extensions 26 of the articulated link 4", 4'''. The two parts 4" and 4''' of said link are articulated between themselves in 27.

In the angular position of the shaft 14 shown in Fig. 6, the eccentrics 23, 23' lift the wheels 13, 13' in respect to the roll 24, which vice versa, is lowered by its eccentric 22. The wheels 13, 13' as well as the roll 24 rest on the articulated link 4" and 4''' and the rollers 5, 5' are disconnected over one another, so that they can freely turn around their shafts 11, 11'. Vice versa, in Fig. 7, the shaft 14 with its eccentrics is in such an angular position to lift the roll 24 in respect to the wheels 13, 13' whereby only these latter rest on the link 4", 4''', the angular deformation whereof around the pivot 27 is not sufficient to follow the lifting of the roll 24 due to the mutual contact between the rollers 5, 5' at point 28. Each stress of the ground 12 to rotation of the rollers 5, 5' is contrasted by the mutual friction occurring at 28 between the said rollers.

Figure 8:
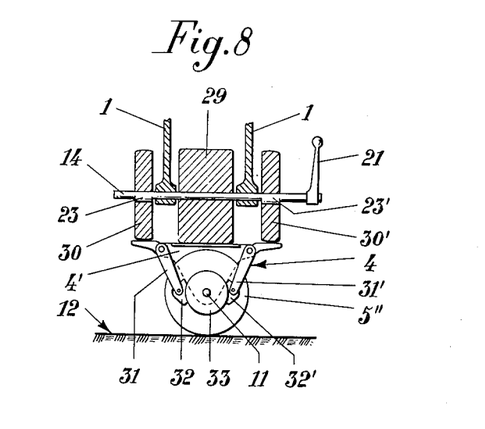
Fig. 8 is a cross-section similar to the preceding Figs. 3 to 5, showing a control device with a shoe-brake acting on a drum connected with each tread-roller.

The form of embodiment shown in Fig. 8, shows again a single roller 5" for each link 4' of the track 4. The load of the frame 1 is transmitted to the link 4' and therefrom to the shaft 11, to the roller 5" and to the ground 12 through a central roll 29 mounted on the shaft 14, which is angularly controlled by the lever 21. Said shaft is provided with two eccentrics 23, 23', whereon are pivotally mounted the rolls 30, 30', which are arranged to co-operate (when in lowered position, due to the position of the eccentrics 23, 23', as shown in the figure) with the levers 31, 31' carrying the brake blocks 32, 32' operating on the drum 33 solidal with the roller 5". The operation of this brake device is different from that shown in Figs. 3 to 7, due to the fact that the lowering of the rolls 30, 30' does not discharge on the members 31, 31' the whole weight of the frame 1, with the load acting thereon, but only a fraction thereof, i. e. just as much as it is necessary for operating the shoe brake 31, 31', 32, 32', 33. It is obvious that instead of the shoe brake shown by way of diagrammatical example, any type of known brake can be used. For instance, the same roller 5" can be internally hollow and provided with an expansion brake (of the type commonly used in the wheels of the motor-cars) mechanically or hydraulically controlled by a member projecting from the link 4' and suitable to come in contact with the rolls 30, 30'.

Figure 9:
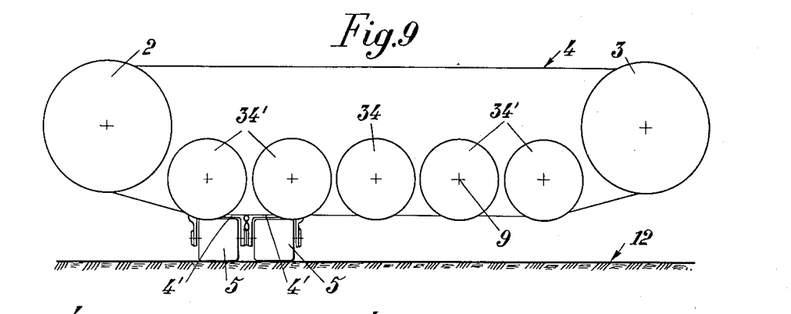
Fig. 9 shows partially and diagrammatically a track similar to that of Fig. 1, wherein more brake devices operate on the whole extension of the track in contact with the ground.

Fig. 9 shows diagrammatically the application of any of the forms of embodiment of brake device, as shown in Figs. 3 to 8, to a track 4 mounted on the main wheels 2 and 3, so that it is possible to obtain at will the braking of the sole rollers 5 passing through the intermediate position of the system, in correspondence with the shaft 9 of the brake device shown generically at 34, or the braking of all or of part of the rollers 5 contained in that portion of the track 4 co-operating with the ground 12, by action of the supplementary brake devices shown at 34'.

This arrangement allows all or a great part of the rollers 5 carrying the load of the vehicle, to be rendered resistant to transverse movement, so as to resist greater exceptional transverse stresses, such as, for example, when the vehicle must move on a steep inclination, in a direction at right angles to the line of maximum declination.

Figure 10:
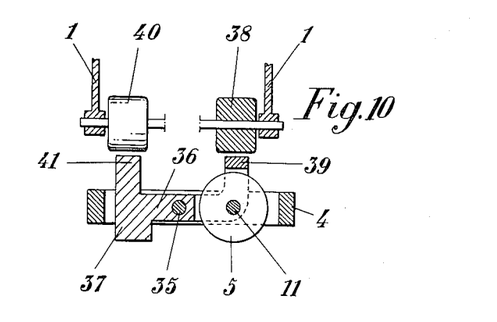
Fig. 10 is a cross-section similar to that of Fig. 2, wherein said brake device comprises a rocking member allowing a part of the weight of the vehicle to be discharged through the track on the ground, by a shoe which temporarily substitutes the roller, co-operating with the same portion of the track.

Fig. 10 shows diagrammatically another system for the transverse braking of the track in a predetermined position of its circuitous path. Each link 4' of the track bears, through a pivot 35, a rocking lever 36, an arm of which is provided with a shoe 37 for resting on the ground, while the other arm carries, by means of the pivot 11, a roller 5. The load of the frame 1 is normally transmitted to the ground through the roll 38 and the upper extension 39 of the rocking lever 36, so that this latter swivels round on its pivot 35 and the roller 5 is brought in contact with the ground while the shoe 37 is lifted therefrom. In the points of the track circuit wherein the rolling effect of the roller 5 is to be suppressed, instead of a roll 38 placed on the extension 39, a roll 40 is journalled in the frame 1, which roll rests on the extension 41 of the rocking lever 36 which, swivelling around on its pivot 35, allows the shoe 37 to rest on the ground and the roller 5 to be lifted, so that the effect of this latter is substituted by the friction of the shoe 37 with the ground, and the transverse movement of the vehicle is prevented.

Figure 11:
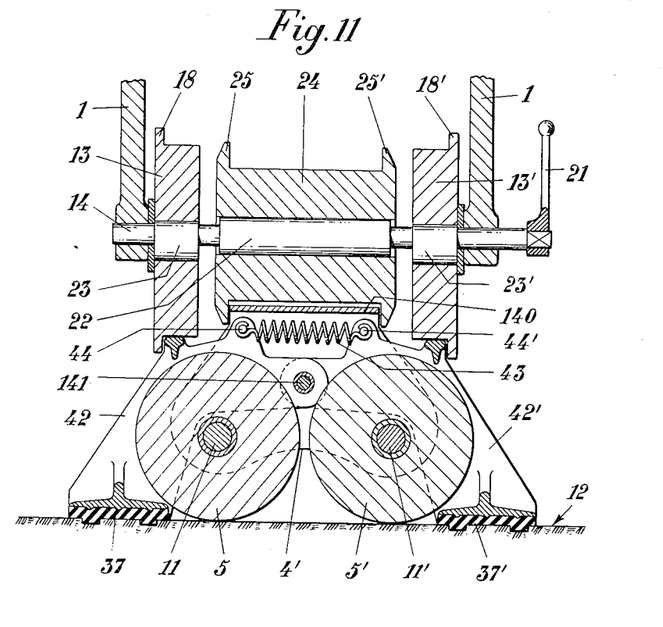
Fig. 11 is a cross-section similar to that of Fig. 7, wherein the brake device is of the type shown in Fig. 10.

A practical form of embodiment incorporating the principle of the device shown in Fig. 10 is reproduced in Fig. 11. In this form of embodiment, which comprises a control device analogous to that shown in Figs. 6 and 7, and wherein the corresponding parts are shown by the same reference numerals, the rollers 5, 5' are mounted on the link 4' of the track, which normally transmits thereto the load of the frame 1 through the roll 24 and the upper flat portion 140 of the same link 4'. Two shoes 37, 37', are mounted so that they oscillate around the pivot 141 carried by the link 4' by means of two angle levers 42, 42'. A return spring 43 operates between the connection points 44 and 44' of the levers 42, 42' and normally keeps the shoes 37, 37' lifted from the ground 12. When the shaft 14 is angularly displaced by the lever 21 so as to lower the wheels 13, 13' provided with the edges 18, 18', by means of the eccentrics 23, 23' and to lift respectively, by means of the eccentric 22, the roll 24 provided with the edges 25, 25' (as shown in Fig. 11) the load of the frame 1 loads more or less on the shoes 37, 37', overcoming the action of the spring 43, so that the tendency of the vehicle to move transversely is restrained.

Figure 12:
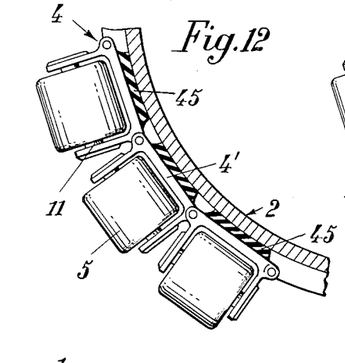
Figs. 12 and 13 show two details of elastic contact between the track and the wheels of the frame.
Figure 13:
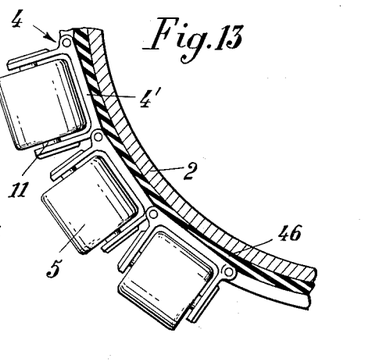

In Fig. 12 is shown a detail of the device of Fig. 1, wherein between the wheel 2 and each link 4' of the track 4 is interposed a rubber pad 45, carried by the same link, the purpose whereof being that of softening the contact between the wheel and the track and of ensuring the transmission of tangential forces between the respective contact surfaces. Fig. 13 is analogous to Fig. 12, with the sole difference that the wheel 2 is itself provided with a continuous rubber coating 46.

Figure 14:
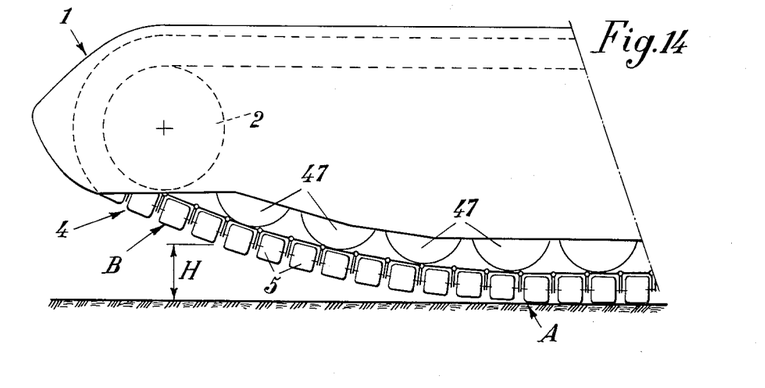
Fig. 14 shows diagrammatically an arrangement of the track according to this invention, which is adapted to practically prevent the insertion of ground material between the links of the track.

Fig. 14 shows an accessory arrangement to be used by the present invention in order to reduce to the minimum the possibility that the track bite stones or other hard objects which may be met on the rolling ground, with successive rollers of the track, in their mutual angular movement, during their passage from the periphery of one of the wheels of the frame to the straight portion of contact with the ground. The frame 1 carries the main wheel 2, whereon passes the track 4 and carries also a series of rest rolls 47, which smooth the connection between the curvature of the track in correspondence with the wheel 2 (where the radius of curvature is equal to the radius of the periphery of the wheel 2) and the curvature of the same track in correspondence with the straight portion beginning in point A, where the radius of curvature is infinite. As the rolls 47 determine a medium radius of curvature of the track substantially very great with respect to the radius of the wheel 2, in the portion from position B, wherein the track detaches from the wheel 2, to the position A, wherein the track comes in contact with the ground, the single rollers 5 reach the practically critical distance from the ground, shown by H in the figure, at such a distance between themselves so that the probability of biting resistant objects is minimized.

Figure 15:
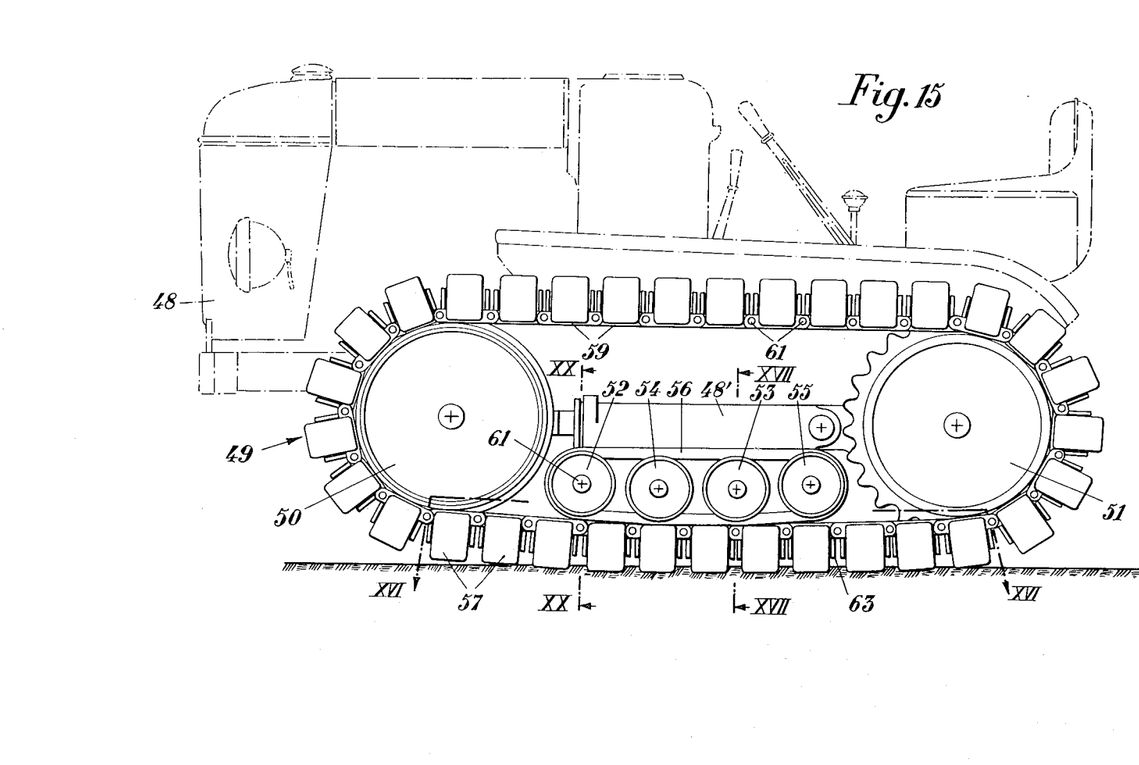
Fig. 15 shows a lateral elevation of a tractor to which the present invention is applied.
Figure 16:
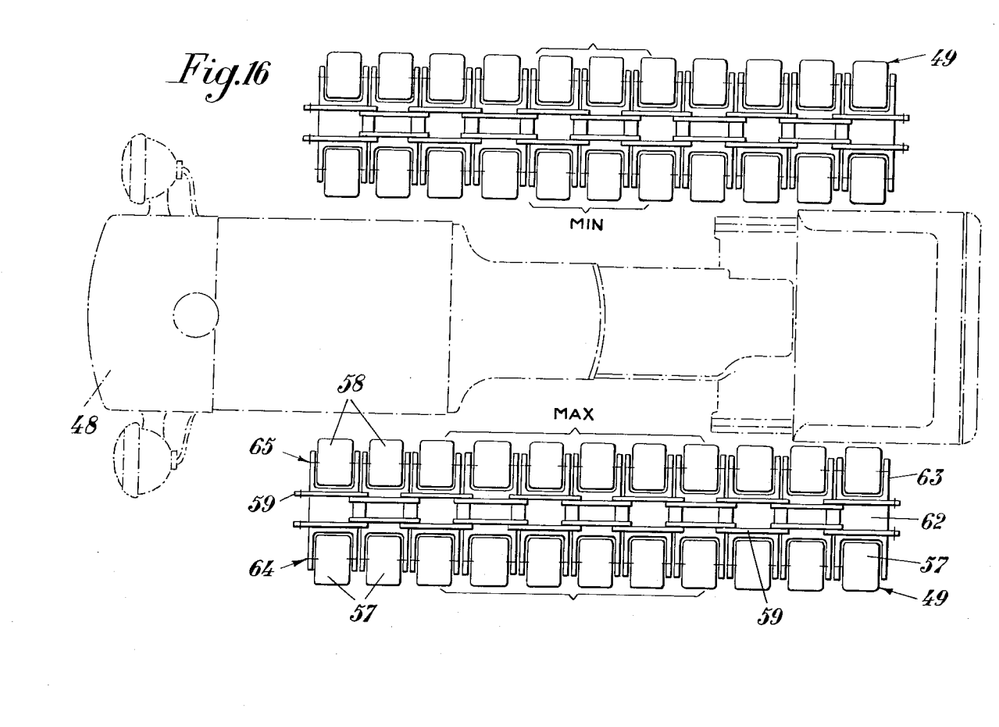
Fig. 16 shows a plane view of the tractor of Fig. 15, with its tracks in cross-section taken along the line XVI—XVI of Fig. 15.
Figure 17:
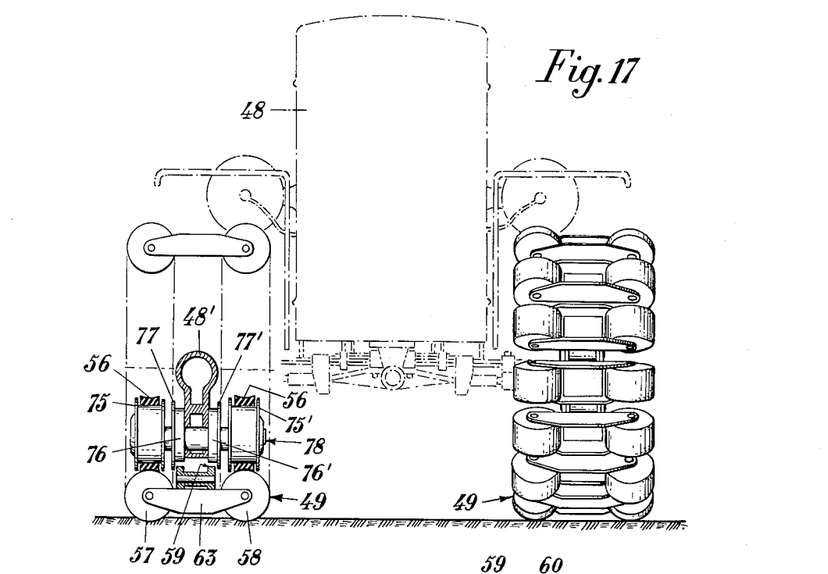
Fig. 17 shows a front elevation, partially in cross-section and with some parts removed, of the tractor of Figs. 15 and 16.

With reference to Figs. 15, 16 and 17 of the attached drawings, the lateral elevation of the tractor clearly shows the aim which is to be reached by this further embodiment of the invention, and the nature and the arrangement of the means whereby the aforesaid aim is attained.

The tractor 48 is provided, on either side, with the track shown in its entirety 49, which passes circuitously round both the wheels 50 and 51, carried and operated by a link chain whereof, at least as far as the coupling with said wheels 50 and 51 and the general arrangement, are known. One link of said chain will be more particularly described hereinafter in order to further make clear the differences in respect to the prior art, as far as the chain per se is concerned.

Inside the track 49, and close to the portion which comes into contact with the ground, is arranged a plurality of rolls, respectively shown at 52, 53, 54 and 55, forming a unit supported by the arm 48', which also is arranged inside the ring of the track 49 and substantially of a known type.

According to this invention, the track 49 is formed by links which will be further described hereinafter, each of which supports two rollers, generically shown at 57 and 58, the axes of rotation of which are parallel to the plane of circuitous motion of the track, and arranged for free rotation round said axes.

In order to obtain the aforementioned aim, the rotary movement of the rollers round their axes is braked throughout a zone wherein said rollers 57 and 58 are in contact with the ground and not only in the points wherein said rollers pass in conjunction with predetermined brake elements. This aim is accomplished by causing an endless ring element 56, in conjunction with each series of rollers 57 and 58, to move with a circuitous motion on the rolls 52, 53, 54 and 55, said element 56 being arranged in a plane parallel to the plane of circuitous motion of the main track, so that at least a portion of each of said ring elements come into contact with the rollers of the facing series in the zone wherein the latter are in contact with the ground, exerting thus on said rollers a continuous braking action in respect to their possibility of rotation round their axes.

As aforementioned, it is also possible to increase, to a more or less extent, the length of said brake zone; this is obtained, according to the present invention, by providing the means whereby it is possible to lift or to lower, in respect to the lower portion of the track 49, the two rolls 52 and 55, so that the contact zone between the endless ring element 56 and the rollers passing therebelow is increased or diminished, submitting thus to the braking action a greater or a minor number of pairs of rollers 57 and 58.

In the plane view of Fig. 16, in order to make clear the arrangement and the effect of the concerned parts, by the brace MIN, there is shown on the right side of the tractor the zone of the track which is involved when the braking effect is reduced to minimum by lifting the rolls 52 and 55; on the left side of the tractor has been marked by the brace MAX, the zone involved when the braking effect has been brought to its maximum length by lowering the aforesaid rolls 52 and 55 so as to increase the length of the portion of the endless ring 56 in contact with the pairs of rollers.

It is to be noted that, as the rollers in the illustrated example are mounted in pairs, forming thus two parallel circuitously moving rings, each track having the same movement, the auxiliary tracks or braking endless rings are double, that is identically repeated on each ring of rollers of each track.

Figures 18, 19:
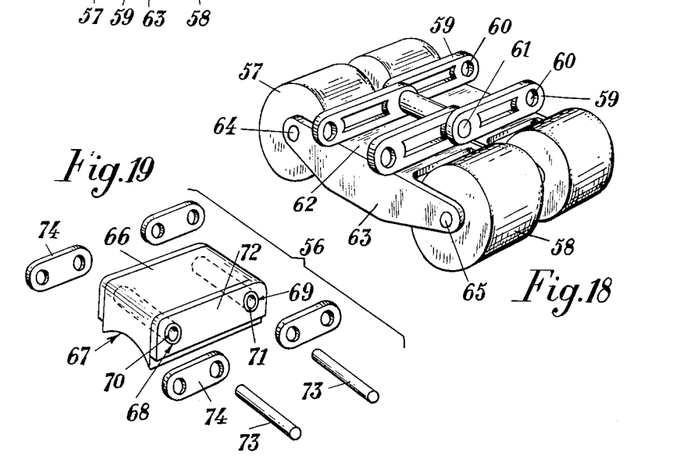
Fig. 18 shows a perspective view, in a slightly enlarged scale of two elements of the track with transversely rotatable rollers.
Fig. 19 shows an exploded view of an element of the brake ring.

Considering more particularly the different elements which are involved by this device, the main track, which has been shown in its entirety at 49, comprises essentially, as Fig. 18, shows, a link chain formed by lateral links 59 provided with the holes 60 for the passage of the connecting bolts 61, forming thus a device of the type of the "Galle" chains. Under the pairs of links 59 forming each linkage, is fixed a plate 62 provided with two ribs 63 placed in a plane at right angles to the plane of the plate. Said ribs 63, in the number of two for each plate, project from the links 59 and support, by their ends the shafts 64 and 65 of the rollers, respectively shown at 57 and 58 which, two by two form the links of the rolling track. The rollers 57 and 58 are freely rotatable around their axes, which are parallel to the plane of circuitous motion of the track; obviously the aforementioned braking action must be exerted on said rollers.

As aforesaid, said braking action is performed not only in conjunction with the single rolls 52, 53, 54 and 55, but also between said rolls by the endless ring 56, which passes circuitously round the complex of the rolls 52, 53, 54 and 55. Said endless ring or auxiliary track 56, which is shown in an exploded view of the component parts thereof in Fig. 19, is formed by a series of shoe blocks 66, made preferably of elastic material and suitable to exert, by their curved surfaces 67, outwardly turned in respect to their circuitous path, an effective blocking action on the facing rollers 57 and 58, with which said surface is brought into contact.

Each block 66 is provided with two holes 68 and 69 wherein are inserted the metallic bushings 70 and 71 slightly projecting from said holes. Outside the block 66, on either side, are mounted the metallic reinforcing plates 72, and fixed by riveting on said plates are the rims of the bushings 70 and 71. Said plates may be omitted if it is desired to leave a certain longitudinal elasticity for the auxiliary track 56. The pins 73 connecting the links 74 are inserted in said holes, which in turn connect the blocks on either side thereof so as to form the auxiliary track suitable for a circuitous motion on the aforementioned rolls.

It has been noted that in the present embodiment it is provided that a certain length of the auxiliary braking track be constantly engaged with the rollers of the rolling track, so as to prevent the rotation of said rollers round their axes, while another portion of the braking track can be, at will, brought to operate more or less, on the rollers of the rolling track, in order to adjust the action of the braking means according to the particular operative connection.

Fig. 17 shows a common cross-section for the rolls 53 and 54 wherein there is constantly the braking action of the braking track on the rollers of the rolling track.

In the cross-sectioned portions of Fig. 17, is clearly shown the rolls, shown at 53 as a whole, and in the lateral elevation in Fig. 15, which comprises a pair of outer rolls 75, 75', on which pass the braking tracks 56, said rolls facing the series of rollers 57 and 58, respectively. The main track 49 which supports, by means of the transverse ribs 63, the rollers 57 and 58, is supported in its lower portion, by the rolls 76 and 76' provided with the edges 77 and 77', which engage the lateral links 59 of the chain supporting the rollers 57 and 58. Thus, the four rolls 75, 75', 76, 76' are placed side by side. The aforementioned assembly of rolls is mounted on a single shaft 78, so that the geometric rotation axes are aligned and centered, lifting thus the pair of rolls 76 and 76' from the links 59, discharging the weight of the vehicle from said rolls and carrying the rolls 75 and 75' to load, through the braking track, on the rollers 57 and 58, discharging thereon the weight of the vehicle. The friction action occurring between the surface 67 of each block 66 and the faced surface of the rollers 57 and 58 prevents obviously these latter from rotating round their axes, embodying thus the desired aim of a continuous brake between the point wherein the surface 67 comes in contact with the surface of the faced roller and the point wherein said elements detach.

According to the present invention it is provided, as aforesaid, that the extent of said zone can be increased or diminished; this result is carried out by lowering or lifting the outer rolls of the end units (shown at 52 and 55 in Fig. 15), and displacing in contrary direction the corresponding inner rolls 53 and 54 guiding the chain of the track, so as to obtain the passage of the load from said chain to the braking elements due to unloading of the chain and contemporaneous loading on said braking elements.

Figure 20:
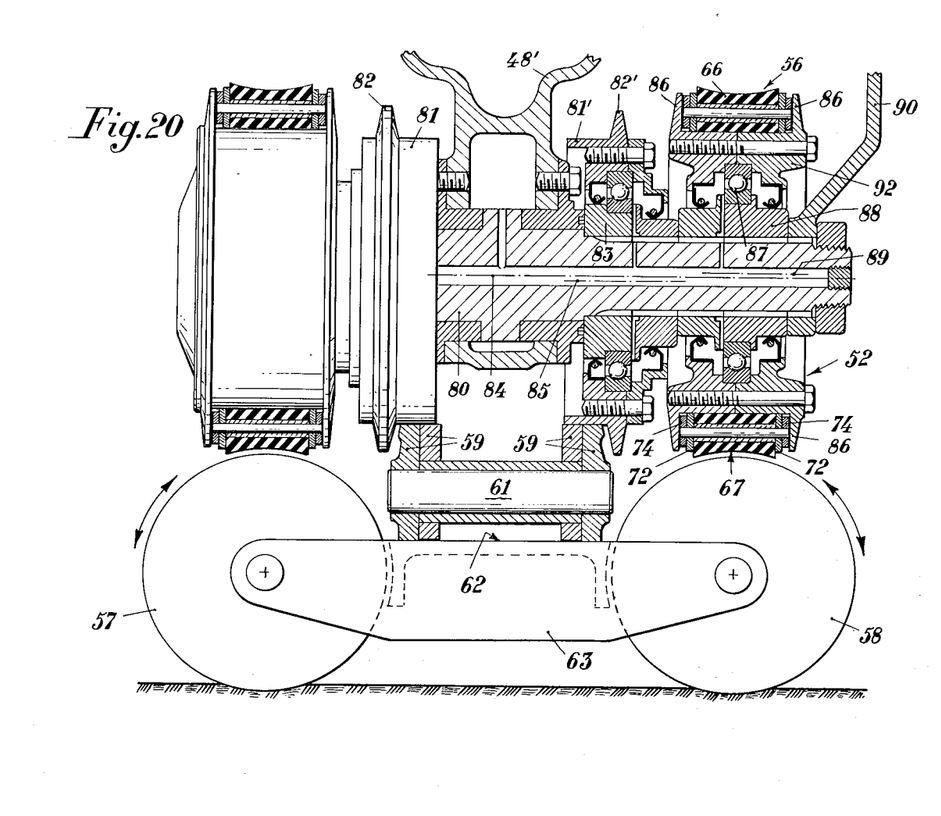
Fig. 20 shows, in enlarged scale, partially in elevation and partially in cross-section, a detail of the supporting wheels for the track and for the brake elements.

The arrangement is shown in detail in the enlarged scale Fig. 20, wherein one of the pair of rolls, either the fore pair or the rear pair, is shown partially in elevation and partially in cross-section, in order to further clearly show the arrangement of the parts, and so much of the rolls as is necessary, wherein it is possible to lower or to lift the braking track.

48' is the supporting arm (see also Fig. 15) for the central shaft 80 whereon are mounted the four rolls forming the unit and precisely the rolls 81 and 81' provided with the edges 82 and 82' (one of the rolls being shown in elevation and the other in cross-section) supporting the links of the chain of the rolling track (the illustrated mesh of linkage rolling track being shown in cross-section taken along the axis of one of the bolts, for example 61) as well as the rolls carrying the braking track 56.

The superposed links 59 are clearly shown in Fig. 20 which links, connected by the bolt 61, allow the links of the chain to be articulated, as well as the plate 62, connected to the ribs 63 supporting the rollers 57 and 58.

The track moves in a circuitous path resting with the upper end of its links 59 on the central portion of the rolls 81 and 81', between the edges 82 and 82' preventing the track from jumping off.

The rolls 81 and 81' are mounted on sleeves 83 which in turn are inserted and blocked on the shaft 80. The sleeves 83 are eccentric in respect to the axis of the shaft 80, and in the present cross-section, 84 is the geometric axis of said shaft, and 85 is the geometric axis of the sleeve 83.

Each braking track, shown at the right in Fig. 20, in cross-section, the block 66 located between the plates 72, is confined and guided by the edges 86 of the roll 92 which by means of the ball bearings 87 is journalled on a sleeve 88 which also is mounted and blocked on the shaft 80, with an eccentricity opposite to that of the sleeve 83.

89, in Fig. 20, is the geometric axis of said sleeve, which is displaced, in respect to the axis 84 of the shaft, in the direction opposite to the axis 85 of the sleeve 83.

The shaft 80, by means of the lever 90, is caused to rotate around its axis, when said lever 90 is operated in a direction to displace it from the plane of the drawing; the swivelling of said lever, involving that of the shaft 80, displaces the eccentricities of the sleeves mounted on the shaft; therefore, assuming that the sleeve 88 is displaced in the direction for lowering the roll 92 and therefore the block 66 until it comes into contact with the roller 58, at the same time the roll 81' is lifted due to the rotation of the sleeve 83, and finally the load acting on the central rolls 81 and 81' is displaced, through the blocks 66 from the braking tracks on the two rollers 57 and 58 which are thus prevented from rotating round their axes by the engagement of the surface 67 of said blocks.

It is clear that the lowering or the lifting of the end rolls 52 and 55 (Figs. 15 and 16) increases or diminishes the braked zone on the rollers.

The present invention has been illustrated and described with reference to certain embodiments, but it is understood that these have been described only by way of example, the invention being defined by the following claims.

This application is a continuation-in-part of applicant's prior application, Serial No. 336,414, filed February 11, 1953, now abandoned.

I claim:

1. A rolling device for track laying vehicles, which comprises an endless segment track, at least one roller associated with each segment of the track and freely rotatable about an axis parallel to the direction of the motion of the track, a braking device associated with each roller and arranged to prevent said roller from rotating when said roller is in a selected portion of the track which is in contact with the ground.

2. A track device for track laying vehicles, which comprises, in combination with a frame, and endless segment track, at least a roller associated with each segment of the track and freely rotatable about an axis parallel to the direction of the motion of the track, at least a wheel mounted on said frame and rotatable about an axis perpendicular to the direction of the motion of the track, said wheel being arranged to be brought into contact with one of the said rollers associated with a segment when said roller is in the portion of the track which is in contact with the ground.

3. A track device for track laying vehicles, which comprises, in combination with a frame, an endless segment track, a roller associated with each segment and freely rotatable about an axis parallel to the direction of the motion of the track, a pair of wheels rotatable on a shaft mounted on the said frame and perpendicular to the direction of the motion of the track, said pair of wheels abutting against one of the said segments of the track which is in the portion of the track in contact with the ground, a roller eccentrically mounted on the said shaft in an intermediate position between the wheels of the said pair of wheels, said roller facing said roller associated with the segment supporting said pair of wheels, means arranged to angularly rotate said shaft with respect to the frame, whereby said intermediate roller is brought into contact with said roller associated with the segment and whereby said pair of wheels is moved away from said segment.

4. A track device for track laying vehicles, which comprises, in combination with a frame, an endless segment track, a roller associated with each segment and freely rotatable about a shaft mounted on each said segment and parallel to the direction of the motion of the track, a pair of wheels eccentrically mounted on a shaft carried by the frame, said pair of wheels abutting against one of the said segments of the track which is in the portion of the track in contact with the ground, a roller mounted on the said last mentioned shaft in an intermediate position between the said pair of wheels, said last mentioned roller facing said roller associated with the segment supporting said pair of wheels, means arranged to angularly rotate said last mentioned shaft with respect to the frame, whereby said intermediate roller is brought into contact with said roller associated to the segment thus preventing the roller last mentioned from rotating and whereby said pair of wheels is moved away from said segment.

5. A track device for track laying vehicles, which comprises, in combination with a frame, an endless segment track, a roller associated with each segment of the track and freely rotatable about a shaft mounted on each segment of said track and parallel to the direction of the motion of the track, a pair of wheels eccentrically mounted on a shaft carried by the frame and perpendicular to the direction of the motion of the track, said pair of wheels abutting against the segment of the track which is in the portion thereof in contact with the ground, a roller eccentrically mounted on the said last mentioned shaft in an intermediate position between said pair of wheels, means arranged to angularly rotate the last mentioned shaft with respect to the frame, whereby said intermediate roller is brought into contact with said roller associated with said segment and prevents the last mentioned roller from rotating, and whereby said pair of wheels is moved away from said segment.

6. A track device for track laying vehicles, which comprises, in combination with a frame, an endless segment track, each segment comprising a pair of links disposed side by side and articulated with each other, a roller associated with each link and freely rotatable about a shaft carried by each link and parallel to the direction of the motion of the track, a pair of wheels eccentrically mounted on a shaft carried by the frame and perpendicular to the direction of the motion of the track, said wheels being arranged to abut against the outer end of the links of a segment which is in the portion of the track in contact with the ground, a roller eccentrically mounted on the said last mentioned shaft in an intermediate position between said pair of wheels and facing the inner end of said links in a zone wherein said links are articulated with each other, means arranged to rotate said last mentioned shaft with respect to the frame, whereby the intermediate roller is brought to abut against said zone of articulation of the links while said wheels are moved away from the outer end of the links thus moving away from each other the periphery of the rollers associated with the links and whereby said intermediate roller is raised from the articulation zone of the two links when the two wheels abut against the outer end of the said links thus bringing into contact with each other the periphery of the two rollers associated with said links whereby the last mentioned rollers are prevented from rotating.

7. A track device for track laying vehicles, which comprises, in combination with a frame, an endless segment track, a roller associated with each segment and freely rotatable about a shaft carried by each said segment and parallel to the direction of motion of said track, a drum applied to each roller, a central wheel mounted on a shaft carried by the frame and perpendicular to the direction of the motion of the track, said wheel being arranged to abut in succession against said segments when the latter are in the portion of the track in contact with the ground, two wheels eccentrically mounted on the said last mentioned shaft laterally of the said central wheel, braking means arranged to be brought into contact with the said drum, means arranged to rotate said shaft carried by the frame, whereby said two lateral wheels operate said braking means and the said roller is prevented from rotating.

8. A track device for track laying vehicles, which comprises, in combination with a frame, an endless segment track each segment of the track being provided with a link, a pair of rollers associated with each link, each roller of the pair being freely rotatable about a relative shaft carried by said link and parallel to the direction of the motion of the track, two shoes laterally disposed with respect to said roller and pivoted by means of a lever on a pivot disposed in a central position on said link, said shoes facing the ground and said levers being elastically connected to each other in their upper part to keep said shoes distanced from the ground, a central wheel eccentrically mounted on a shaft carried by the frame and perpendicular to the direction of the motion of the track, said central wheel abutting against the link of one of the segments of the track which is in the portion of the track in contact with the ground, two lateral wheels eccentrically mounted on the last mentioned shaft laterally of the said central wheel, the periphery of said lateral wheels facing said lever of the shoes and being arranged to come into contact with said levers, means arranged to rotate the last mentioned shaft with respect to the frame, whereby said lateral wheels are brought into contact with said levers of the shoes, thus bringing said shoes into contact with the ground.

9. A track device for track laying vehicles, which comprises, in combination with a frame, an endless segment track each segment being provided with a link, a roller associated with each link, freely rotatable about a shaft carried by said link and parallel to the direction of the motion of the track, a braking device applied to the frame and arranged to prevent said rollers from transversely rotating when they are in the portion of the track in contact with the ground.

10. A track device for track laying vehicles, which comprises, in combination with a frame, an endless segment track, each track being provided with a link, at least one roller associated with each link and freely rotatable about a shaft carried by said link, and parallel to the direction of the motion of the track, an endless chain movable in a circuitous path parallel to the said track and driven from the latter, said endless chain being arranged to be brought into contact with a plurality of the said rollers associated with the said links of the segments which are in the portion of the track contacting the ground, whereby the said last mentioned rollers are prevented from rotating while moving together with the track.

11. A track device for track laying vehicles, which comprises in combination with a frame, an endless segment track, each segment being provided with a link, a pair of rollers associated with each link freely rotatable about a relative shaft carried by the link and parallel to the direction of the motion of the track, a plurality of wheels carried by the frame and arranged to face the inner surface of the said track, a pair of endless chains mounted on said plurality of wheels and moving in a circuitous path parallel to the direction of the motion of the track and driven by the latter, each chain being kept in contact by means of the said wheels with a plurality of said rollers associated to the links of the rollers which are in the portion of the track in contact with the ground to prevent said rollers from transversely rotating while permitting the rollers to move together with the track, means arranged to vary the length of the portion of the endless chain which is brought into contact with said plurality of rollers associated with the said links.

12. A track device for track laying vehicles, which comprises, in combination with a frame, an endless segment track, each segment being articulated with the contiguous segments and comprising a plate provided with two ribs, said ribs being arranged to carry two shafts parallel to the direction of the motion of the track, two rollers associated with each segment and rotatably mounted on said shafts, a braking device for the rollers associated with a plurality of segments of the track which are in contact with the ground, said braking device comprising for each segment of the track of shaft carried by the frame and perpendicular to the direction of the motion of the track, two wheels eccentrically mounted in an intermediate position on the said last mentioned shaft and engaging the segments of the track which are in the portion of the track in contact with the ground, said wheels transmitting to the segment the weight of the vehicle, two lateral wheels eccentrically mounted at the two ends of the said last mentioned shaft and facing said two rollers associated to the segment of the track, an endless braking chain for each roller, said chain being formed with members articulated with each other and being carried by said lateral wheels, said lateral wheels being arranged to keep raised said endless braking chain from the rollers associated with each segment of the track in contact with the ground when said central wheels abut against said last mentioned segment of the track and transmit to the said last mentioned segment the weight of the vehicles, means arranged to rotate said shaft whereon said central and said lateral wheels are eccentrically mounted to lower said lateral wheels and said endless chains against said rollers associated with the segments of the last mentioned track and simultaneously to move away said central wheels from said segments of track, whereby the weight of the vehicle is transmitted to the ground by means of the said endless chains which abut against said rollers associated therewith thus preventing the latter from rotating transversely.

References Cited in the file of this patent
UNITED STATES PATENTS

| | | |
|---|---|---|
| 1,407,964 | Turnbull | Feb. 28, 1922 |
| 1,752,395 | Richardson | Apr. 1, 1930 |